United States Patent [19]
Hiramatsu et al.

[11] Patent Number: 5,912,973
[45] Date of Patent: Jun. 15, 1999

[54] METHOD FOR SCRAMBLING AND/OR DESCRAMBLING FM SUBCARRIER DATA

[75] Inventors: Tatsuo Hiramatsu, Higashiosaka; Hironori Mitoh; Noriaki Minami, both of Osaka; Yoshikazu Tomida, Hirakata; Kanji Nakano, Katano, all of Japan

[73] Assignee: Sanyo Electric Co., Ltd., Osaka, Japan

[21] Appl. No.: 08/623,792

[22] Filed: Mar. 29, 1996

[30] Foreign Application Priority Data

Mar. 30, 1995 [JP] Japan .................................. 7-072740
Jul. 25, 1995 [JP] Japan .................................. 7-188866

[51] Int. Cl.$^6$ ........................................... H04L 9/06
[52] U.S. Cl. ............................................ 380/28; 380/44
[58] Field of Search ................... 380/9, 28, 37, 380/43, 44, 49

[56] References Cited

U.S. PATENT DOCUMENTS

| | | | |
|---|---|---|---|
| 4,700,387 | 10/1987 | Hirata | 380/20 |
| 5,081,676 | 1/1992 | Chou et al. | 380/44 X |
| 5,113,443 | 5/1992 | Brockman | 380/9 X |
| 5,151,938 | 9/1992 | Griffin, III et al. | 380/43 |
| 5,222,137 | 6/1993 | Barrett et al. | 380/44 X |
| 5,377,266 | 12/1994 | Katta et al. | 380/49 X |
| 5,406,626 | 4/1995 | Ryan | 380/9 |
| 5,416,841 | 5/1995 | Merrick | 380/44 X |
| 5,488,658 | 1/1996 | Hirashima | 380/43 X |
| 5,488,661 | 1/1996 | Matsui | 380/44 X |
| 5,506,902 | 4/1996 | Kubota | 380/9 |
| 5,515,437 | 5/1996 | Katta et al. | 380/20 |
| 5,517,614 | 5/1996 | Tajima et al. | |
| 5,621,799 | 4/1997 | Katta et al. | 380/49 X |
| 5,636,279 | 6/1997 | Katta et al. | 380/20 |
| 5,757,825 | 5/1998 | Kimura et al. | 371/37.7 |

*Primary Examiner*—Harshad Patel
*Assistant Examiner*—Paul D. Amrozowicz
*Attorney, Agent, or Firm*—Nikaido, Marmelstein, Murray & Oram LLP

[57] ABSTRACT

An FM multiple radio broadcasting receiver includes a data group number and data packet number derivation circuit by which a data group number and a data packet number included in a prefix of FM subcarrier data are derived. A first random number generator generates a first random number on the basis of the data group number, the data packet number and scramble key data which is outputted from a scramble key generation circuit, and sets the first random number in a second random number generator as its initial value. Therefore, it is possible to appropriately scramble or descramble with using packet structure of the FM subcarrier data.

24 Claims, 9 Drawing Sheets

F I G.9
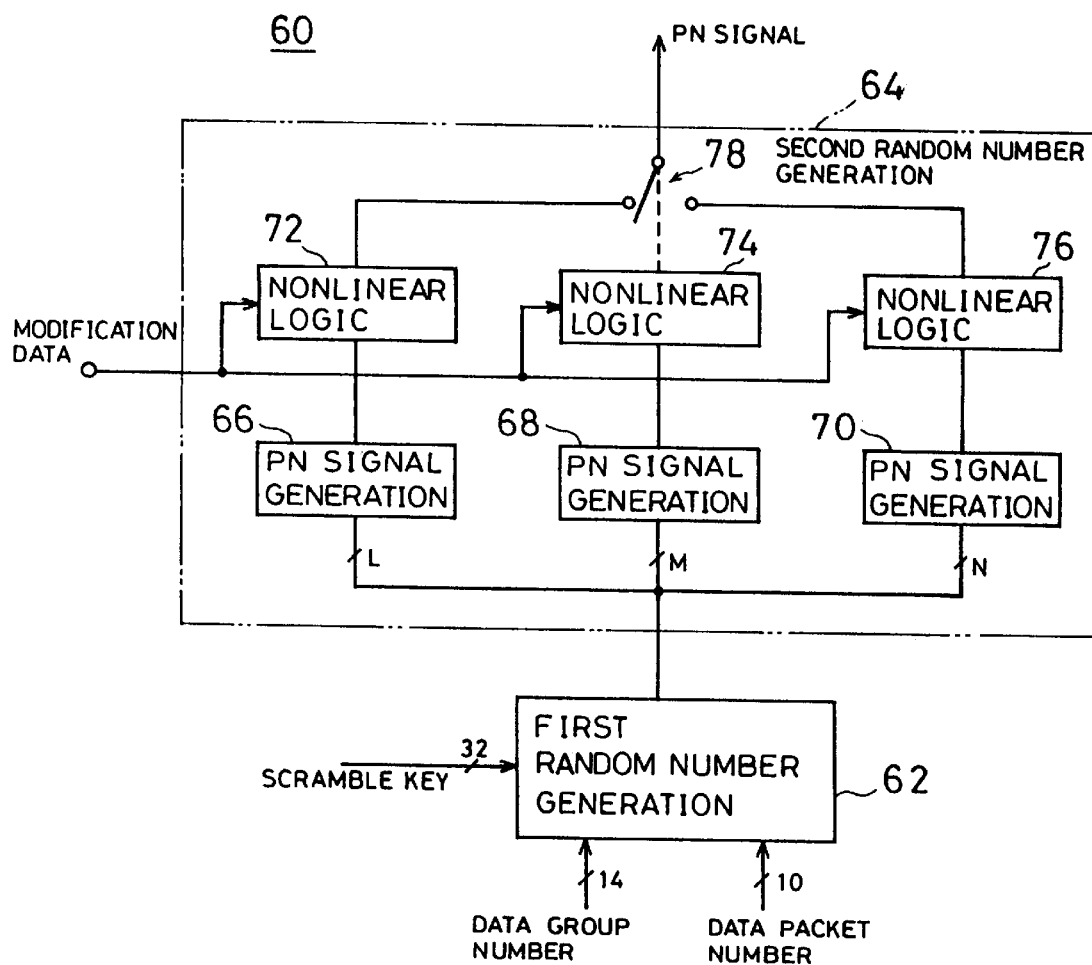

F I G. 10
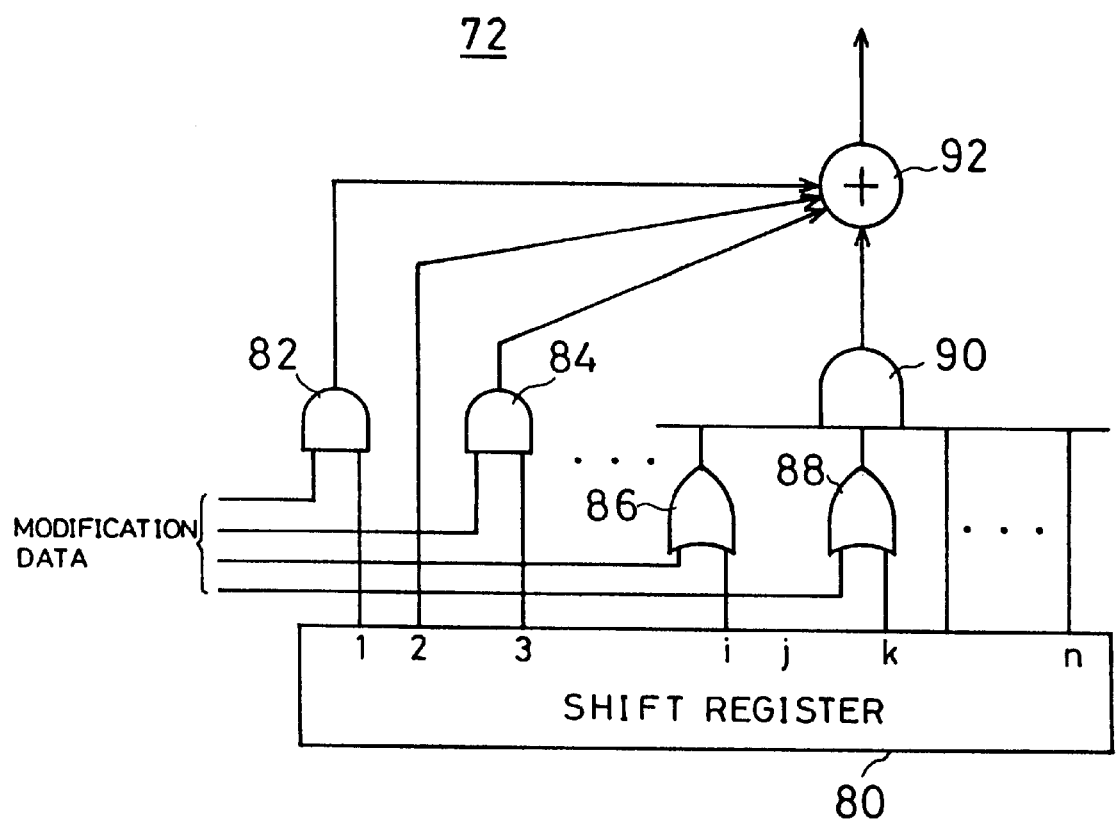

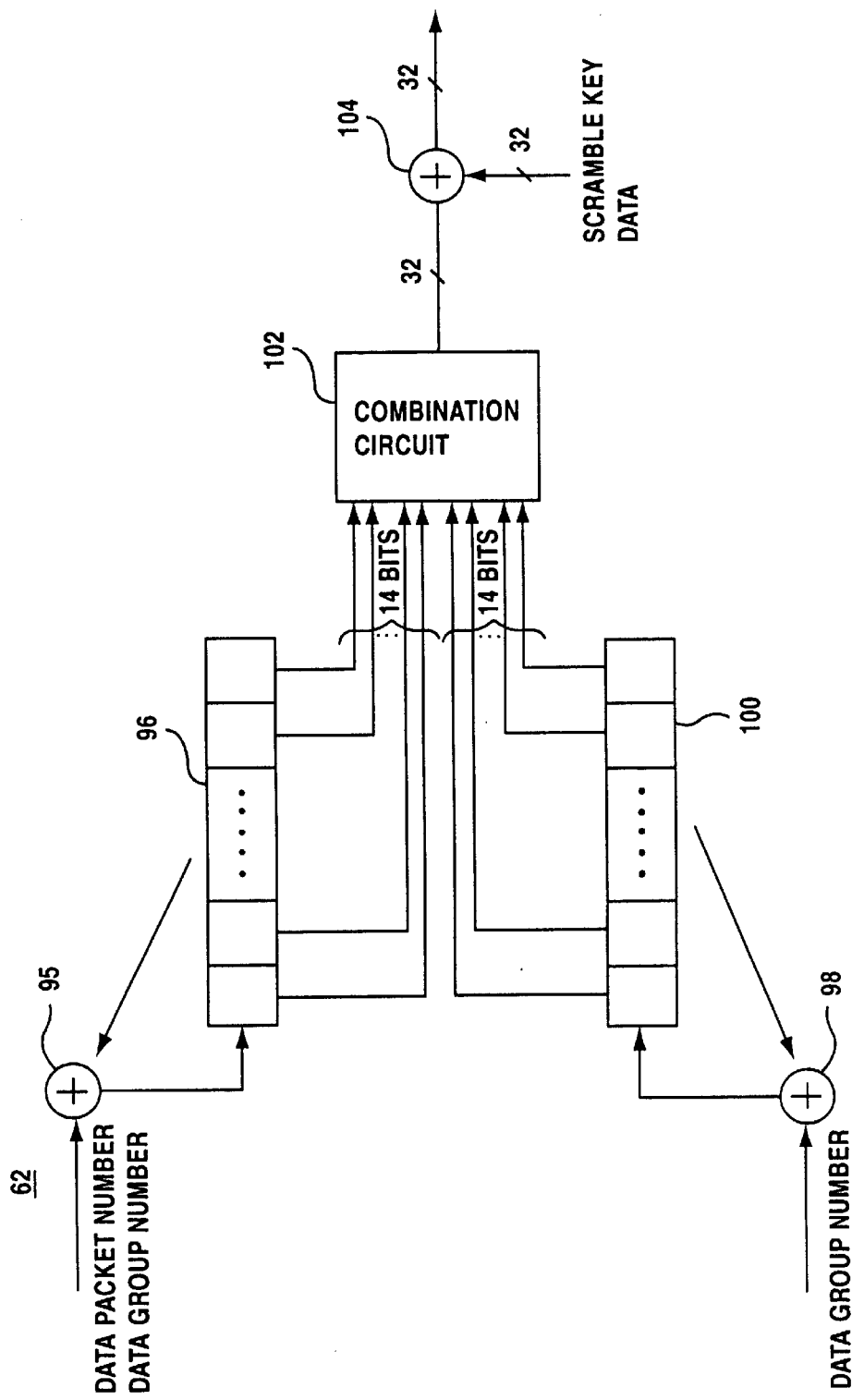

METHOD FOR SCRAMBLING AND/OR DESCRAMBLING FM SUBCARRIER DATA

BACKGROUND OF THE INVENTION

1. Field of the Invention

The present invention relates to a method for scrambling and/or descrambling FM subcarrier data. More specifically, the present invention relates to a method for scrambling and/or descrambling FM subcarrier data in an FM multiple radio broadcasting system, which scrambles and/or descrambles input data by possessing a random number and the input data in an exclusive OR manner, and relates to a method for generating scramble key data.

2. Description of the Prior Art

It has been proposed to broadcast traffic information with using the FM multiple radio broadcasting system. In order to offer the traffic information to only a member at a charge, data of the traffic information may be scrambled.

On the other hand, a specific scrambling method and descrambling method in a satellite broadcasting system are suggested in, for example, "Technical Condition for Data Broadcasting in Satellite Broadcasting System" published by BROADCASTING TECHNOLOGY DEVELOPMENT CONFERENCE in June, 1993. One example is shown FIG. 1 to FIG. 3.

In scrambling and/or descrambling data in the satellite broadcasting system, an initial value is set in an initial value register included in a PN (Pseudo Noise) signal generation circuit shown in FIG. 1 on the basis of scramble key data. Then, the initial value is modified by an initial value modification circuit shown in FIG. 2, and a modified initial value is set in feedback registers of a PRBS generation circuit shown in FIG. 3. Details are described in page 51 to page 57 of "Technical Condition for Data Broadcasting in Satellite Broadcasting System".

However, the above described scrambling and/or descrambling method of the satellite broadcasting system can not be used in the FM multiple radio broadcasting system because there is a structual difference between a data packet of the data in the satilite broadcasting system and a data packet of the data in the FM multiple radio broadcasting system.

SUMMARY OF THE INVENTION

Therefore, a principal object of the present invention is to provide a method for appropriately scrambling method and/or descrambling FM subcarrier data in the FM multiple radio broadcasting system.

Another object of the present invention is to provide a novel method for generating scramble key data used in scrambling and/or descrambling the data.

According to the present invention, a method for scrambling FM subcarrier data in an FM multiple radio broadcasting system, comprises steps of: (a) generating a first random number on the basis of a data group number and a data packet number included in a prefix of the FM subcarrier data, and scramble key data; (b) setting the first random number as an initial value; (c) generating a second random number on the basis of the initial value; and (d) processing the second random number and input data in an exclusive OR manner.

The data group number and the data packet number are included in the prefix of the FM subcarrier data. Then, the first random number is generated on the basis of the data group number, the data packet number and the scramble key data. The first random number is set as the initial value for the second random number, and then, the second random number is generated on the basis of the initial value. Thereafter, the second random number is processed in the exclusive OR manner together with the input data.

In an aspect of the present invention, the first random number is generated as follows. A portion of the data of the data group number and the data of the data packet number are set into a first M series generation means, and the data of the data group number is set into a second M series generation means. An output of the first M series generation means and an output of the second M series generation means are combined with each other by a combination means, and an output of the combination means and the scramble key data are processed in the exclusive OR manner. Then, data thus processed becomes the first random number.

In another aspect of the present invention, the second random number is generated as follows. A PN signal of a plurality of bits is generated by a PN signal generation means on the basis of the initial value, and the PN signal is processed in accordance with a nonlinear logic and modification data, and data thus processed becomes the second random number.

Predetermined data included in the prefix, for example, is used as the modification data, and lower data of a predetermined number of bits of the data packet number, for example, is used as the predetermined data included in the prefix.

Furthermore, the PN signal generation means includes, for example, a register of a plurality of bits, and the PN signal is processed as follows, for example. Outputs of predetermined bits of the register are gated gates, and outputs of the gates and the predetermined bits of the register are processed in exclusive OR manner. In addition, the gates are controlled by the modification data, for example.

It is sure that the prefix of 32 bits, for example, is formed at a head of each packet in the FM multiple radio broadcasting system, and that the data group number of 14 bits, for example, and the data packet number of 10 bits, for example, are included in the prefix. On the other hand, the scramble key data is included in a second packet, for example. Accordingly, it is possible to scramble data included in and after a third packet.

According to the present invention, a method for generating key data for scrambling and/or descrambling FM subcarrier data comprises steps of; (a) detecting first key data and second key data which are set in a predetermined packet of a data group of the FM subcarrier data; and (b) generating the scramble key data by processing the first key data and the second key data.

The first key data and the second key data which are set in the predetermined packet of the data group of the FM subcarrier data are detected, and then, the scramble key data is generated by processing the both key data.

The number of bits of the first key data is smaller than the number of bits of the second key data, for example, and therefore, the first key data is expanded in a manner that the number of bits of the first key data becomes equal to the number of bits of the second key data prior to the processing of the both key data. Preliminary key data, for example, is used as the first key data, and present key data, for example, is used as the second key data.

In an aspect of the present invention, next key data and data of renewal timing are set into a predetermined packet of the FM subcarrier data, the present key data is replaced with the next key data at a timing indicated by the renewal timing data.

Since the scramble key data is generated by processing the first key data and the second key data set in the predetermined packet of the FM subcarrier data, it is possible to scramble and/or descramble the FM subcarrier data appropriately with using the structure of the data packet of the FM subcarrier data.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram showing one example of a random number generation circuit of FIG. 4 embodiment;

FIG. 10 is a block diagram showing one example of a nonlinear logic circuit in FIG. 9 embodiment; and FIG. 11 is a block diagram showing one example of a second random number generation circuit in FIG. 9 embodiment.

DETAILED DESCRIPTION OF THE PREFERRED EMBODIMENTS

Figure 4:
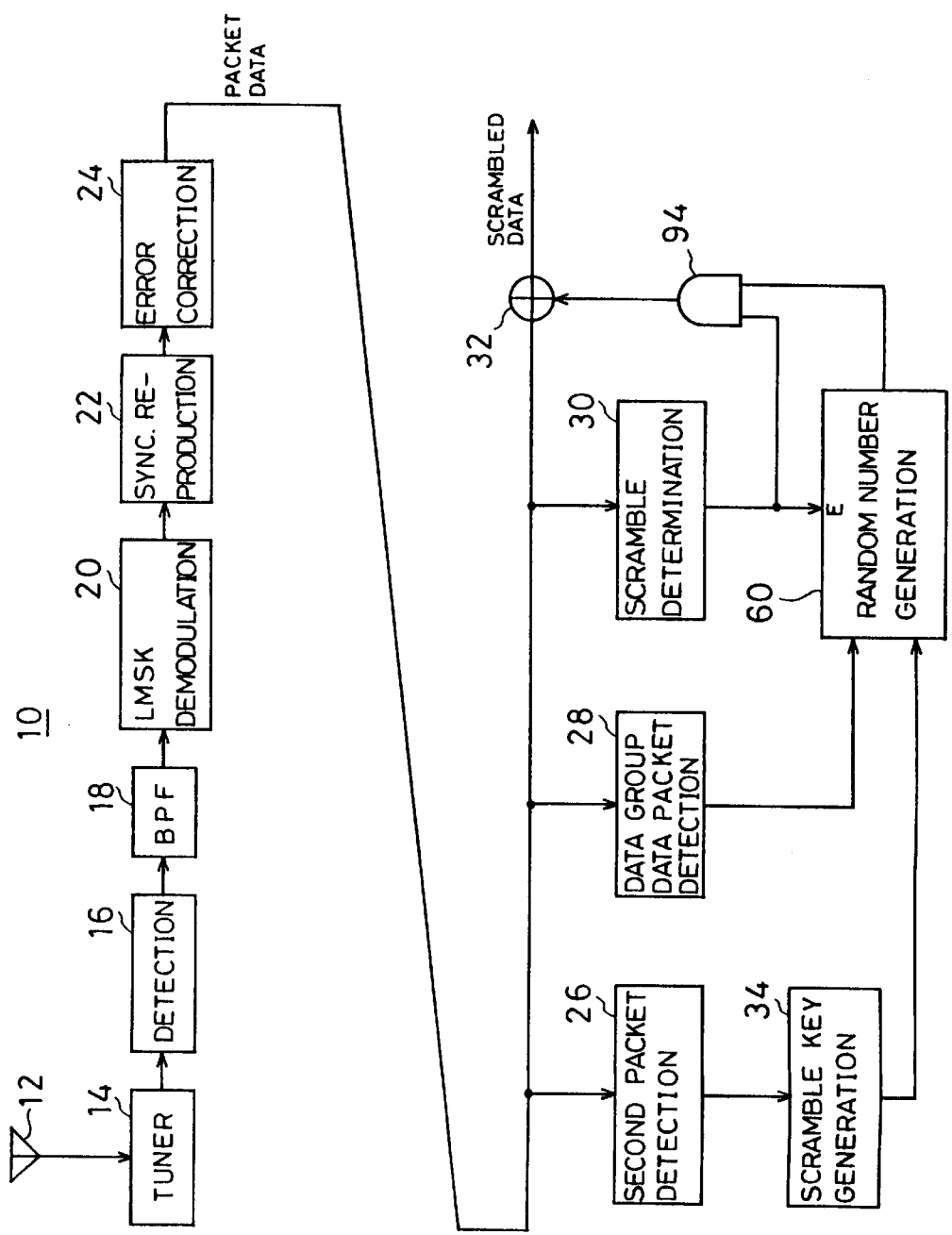
FIG. 4 is a block diagram showing an FM multiple radio broadcasting receiver of an embodiment according to the present invention.

An FM multiple radio broadcasting receiver 10 of this embodiment shown in FIG. 4 includes an antenna 12 and a tuner 14 thereby to receive an FM multiple radio broadcasting signal. The FM multiple radio broadcasting signal is detected by a detection circuit 16, and is applied to an LMSK demodulation circuit 20 through a bandpass filter 18. The LMSK demodulation circuit 20 demodulates data in the FM multiple radio broadcasting signal, and demodulated data is applied to an error correction circuit 24 through a synchronization signal reproduction circuit 22. Accordingly, packet data of FM subcarrier data which is correctly received or subjected to an error correction is outputted from the error correction circuit 24.

Figure 5:
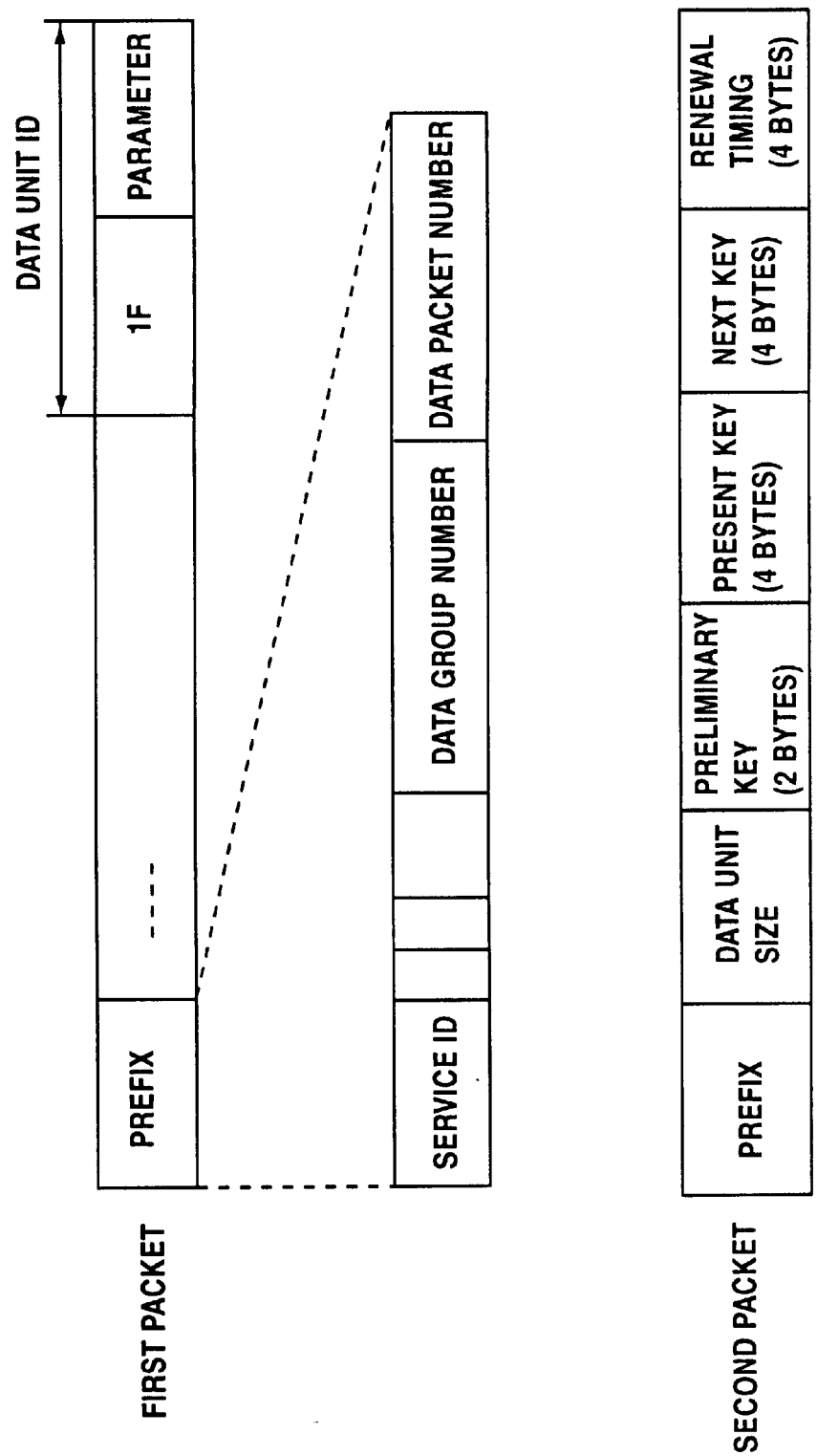
FIG. 5 is an illustrative view showing one example of structure of data packets FM subcarrier data in an FM multiple radio broadcasting system.

The packet data is transmitted in an order of first packet data, second packet data, . . . as shown in FIG. 5. Each of packet data is constructed with 22 bytes (176 bits) basically. The first packet data includes a prefix of, for example, 32 bits and a data unit identification code following the prefix. A data group number of, for example, 14 bits and a data packet number, for example, 10 bits are set in the prefix.

The data unit identification code includes a header and a parameter, and the header shows itself is a portion of the data unit identification code, and the parameter shows a character of a data unit. Specifically, the data unit identification code shows that the second packet data includes key data. Each of data unit size data, preliminary key data, present key data, next key data and renewal timing data is included in the second packet. The data unit size data is data showing how many bytes the data of second packet is constructed by. The preliminary key data is 2 bytes. The present key data is 4 bytes as well as the next key data. The renewal timing data is also 4 bytes. The preliminary key data and the present key data are renewed at every one packet. In addition, the next key data is data transmitted for notification, and when a date and a time become equal to the date and the time indicated by the renewal timing data, the next key data is used instead of the present key data. However, it is not necessary to transmit the next key data and the renewal timing data. The preliminary key data and the present key data are used for generating scramble key data.

Since the first packet data is used for the prefix, the data unit identification code and so on, in this embodiment shown, data associated to the scramble key data as shown in FIG. 5 are set in the second packet data so that the scramble key data can be generated at a timing as earlier as possible after the first packet. Accordingly, if information data is set in and after a third packet, it is possible to scramble and/or descramble the information data.

Returning back to FIG. 4, the packet data is applied to a second packet data derivation circuit 26, a data block number and data packet number derivation circuit 28 and a scramble determination circuit 30, and further applied to one input terminal of an exclusive OR circuit 32.

Figure 6:
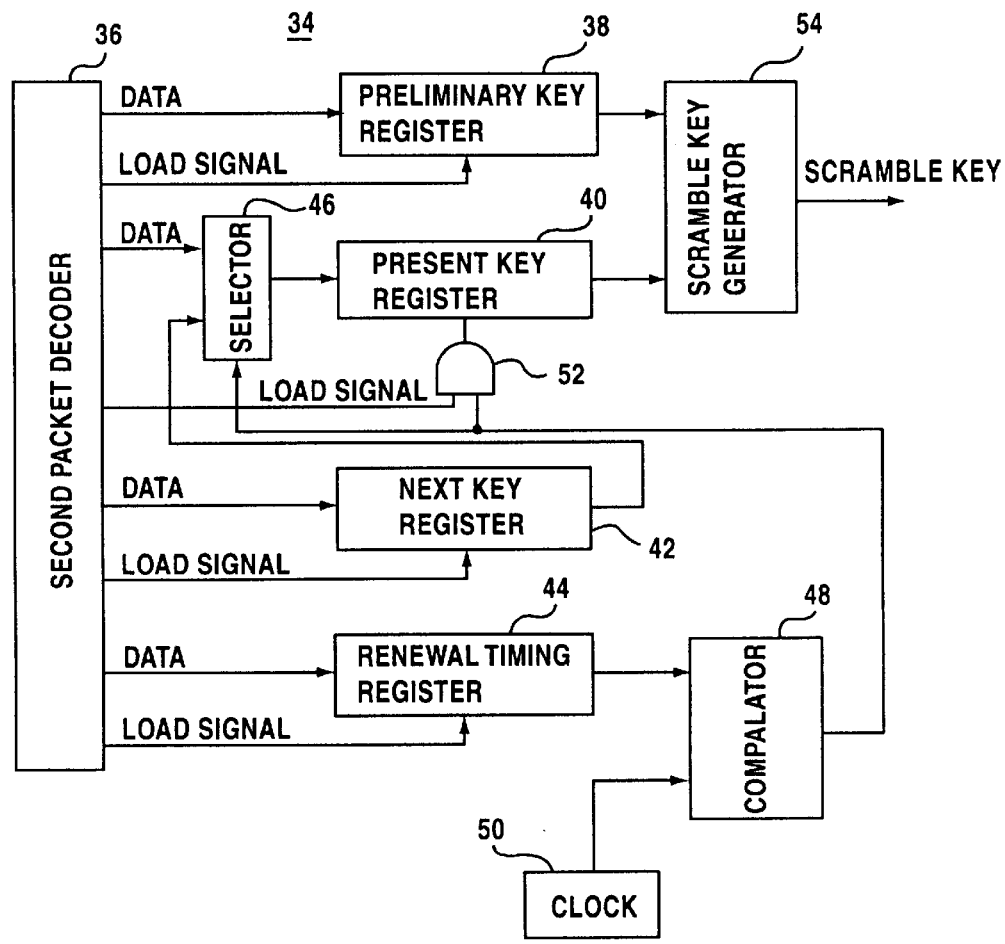
FIG. 6 is a block diagram showing one example of a scramble key generation circuit of FIG. 4 embodiment.

The second packet data derived by the second packet data derivation circuit 26 is applied to a scramble key generation circuit 34. The scramble key generation circuit 34 includes a second packet decoder 36 as shown in FIG. 6, which derives each of the preliminary key data, the present key data, the next key data and the renewal timing data shown in FIG. 5 to load the same in a preliminary key register 38, a present key register 40, a next key register 42 and a renewal timing register 44.

In addition, an output of a selector 46 is applied to the present key register 40, and the present key data from the second packet decoder 36 and the next key data loaded in the second key register 42 are applied to the selector 46. The selector 46 selects either the present key data or the next key data in accordance with a signal from a comparator 48 to apply a selected one to the present key register 40.

More specifically, the comparator 48 compares the renewal timing data loaded in the renewal timing register 44 and clock data applied from a timepiece or clock circuit 50 with each other. When both data are coincident with each other, high level signal is outputted from the comparator 48. When the both data are incoincident, a low level signal is outputted. A load signal from the second packet decoder 36 is applied to the present key register 40 through an AND gate 52 in response to the high level signal from the comparator 48. Furthermore, the selector 46 selects the next key data from the next key register 42 in response to the high level signal from the comparator 48. Accordingly, a present date and a present time become coincident with a date and a time indicated by the renewal timing data loaded in the renewal timing register 44, a content of the present key register 40 is replaced with a content of the next key register 42. That is, the present key data is changed or renewed.

Figure 7:
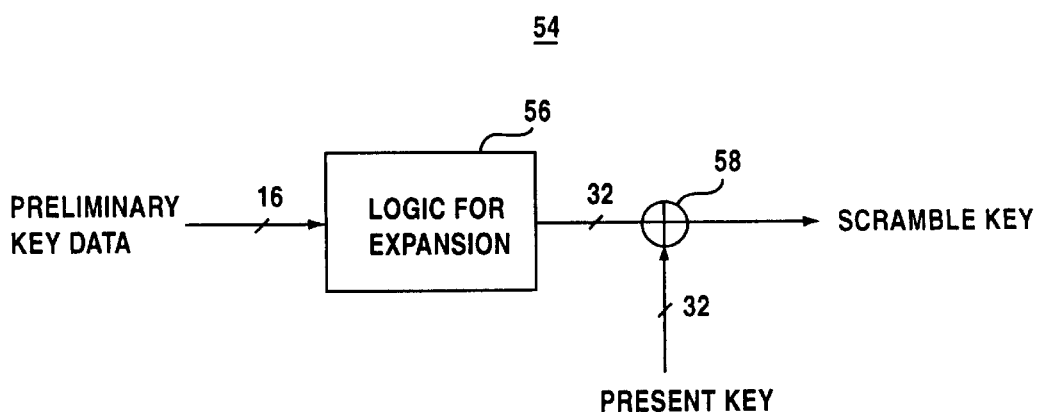
FIG. 7 is a block diagram showing one example of a scramble key generator of FIG. 6 embodiment.
Figure 8:
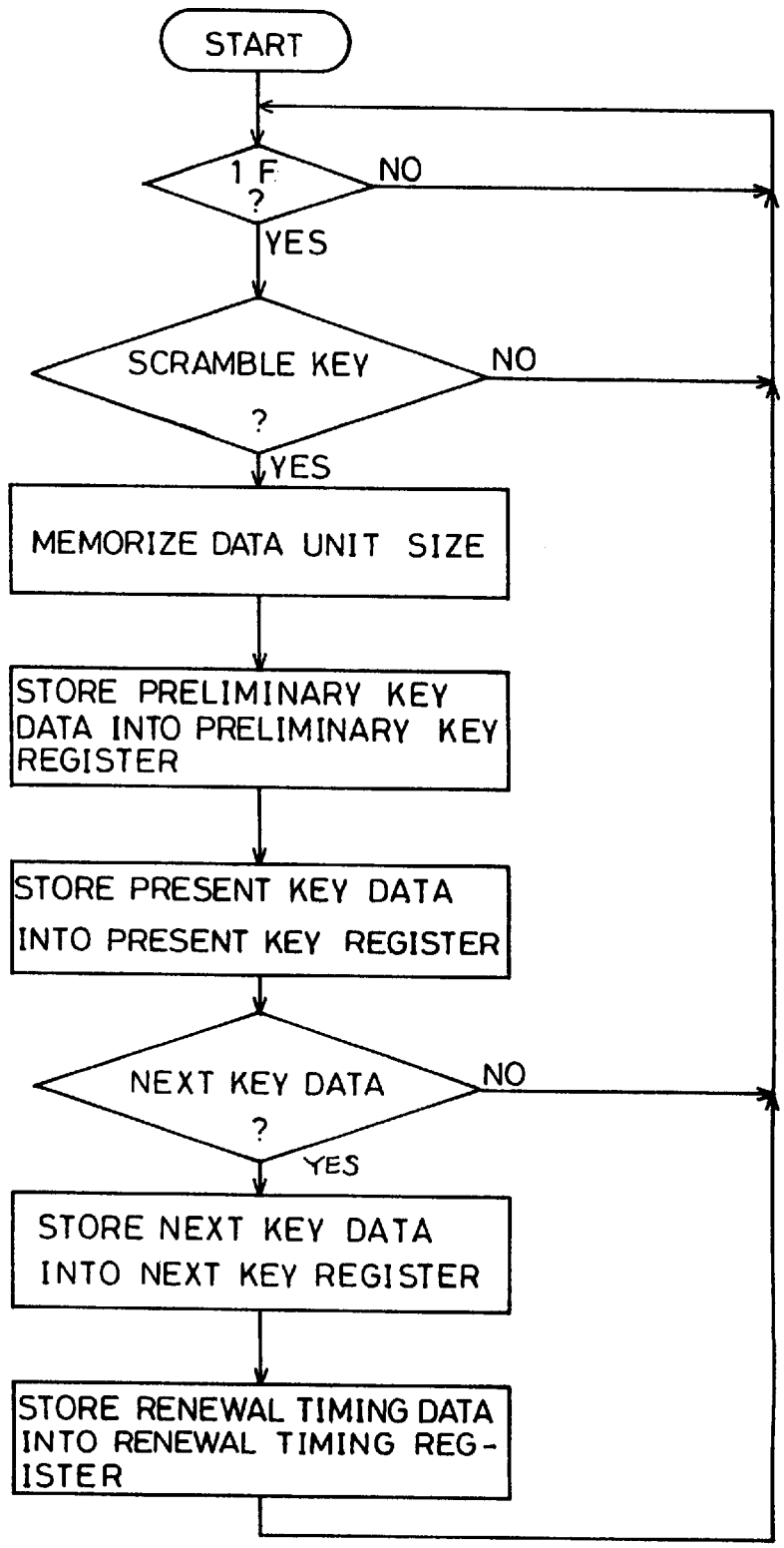
FIG. 8 is a flowchart showing an operation of the scramble key generation circuit shown in FIG. 6.

The preliminary key data loaded in the preliminary key register 38 and the present key register loaded in the present key register 40 are applied to a scramble key generation circuit 54. As shown in FIG. 7, the scramble key generation circuit 54 includes a logic circuit for expansion 56 and an exclusive OR circuit 58. The preliminary key data of 16 bits is applied to the logic circuit for expansion 56 thereby to expand the preliminary key data to 32 bits. The preliminary key data of 32 bits thus expanded and the present key data of 32 bits are applied to the exclusive OR circuit 58, and scramble key data produced by the preliminary key data and the present key data is outputted from the exclusive OR circuit 58. In addition, above described operation is simply shown in FIG. 8.

Thus, the scramble key data is outputted from the scramble key generation circuit 34 to be applied to a random number generation circuit 60 shown in FIG. 4. The data group number and the data packet number derived by the data group number and data packet number derivation circuit 28 are also applied to the random number generation circuit 60.

The random number generation circuit 60 includes a first random number generator 62 and a second random number generator 64 as shown in FIG. 9. The scramble key data of 32 bits, the data group number of 14 bits and the data packet number of 10 bits are applied to the first random number generator 62. The first random number generator 60 generates a random number data of 32 bits on the basis of the scramble key data, and applies the first random number to apply to the second random number generator 64.

More specifically, the first random number generator 62 includes an exclusive OR circuit 95 and a shift register 96 of 14 bits as shown in FIG. 11, and the data packet number of 10 bits and lower 4 bits of the data group number of 14 bits are set into the shift register 96 as an initial value through the exclusive OR circuit 95. Outputs of predetermined bits of the shift register 96 are fed back to the exclusive OR circuit 95. The shift register 96 stops its operation after shifting of, for example, 14 times, whereby a random number can be outputted from the shift register 96. That is, the exclusive OR circuit 95 and the shift register 96 construct an M series generator.

The first random number generator 62 also includes an exclusive OR circuit 98, and the data group number of 14 bits is set into a shift register 100 as an initial value through the exclusive OR circuit 98. Outputs of predetermined bits of the shift register 100 are also fed back to the exclusive OR circuit 98, and the shift register 100 stops its operation after shifting of 14 times. Therefore, the shift register 100 outputs a random number. Accordingly, the exclusive OR circuit 98 and the shift register 100 also construct an M series generator.

Outputs from the shift registers 96 and 100 are applied to a combination 10 circuit 102. The combination circuit 102 combines the outputs from the shift register 96 and 100 to each other to generate combined data of 32 bits, and applies the combined data to an exclusive OR circuit 104. The exclusive OR circuit 104 outputs a first random number of 32 bits by processing the combined data and the scramble key data.

In addition, the number of the bits fed back to the exclusive OR circuits 94 and 98 from the shift registers 96 and 100 may be arbitrary, and it is not necessary to output bit data at the same bit positions. But, it is necessary to feed back the least significant bit data of shift registers 96 and 100.

Figure 1:
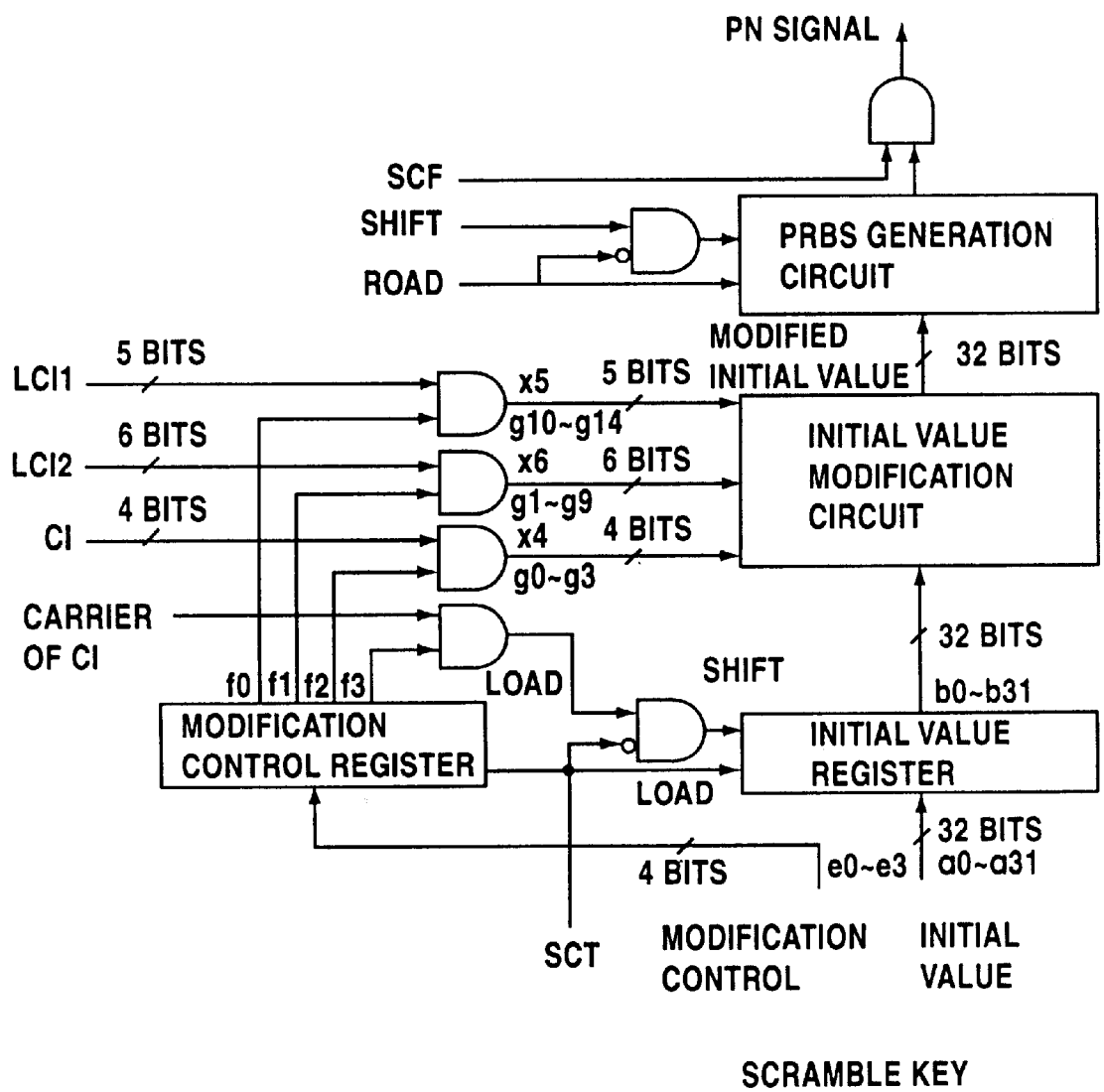
FIG. 1 is a block diagram showing one example of a PN signal generation circuit used for data broadcasting in a satellite broadcasting system.
Figure 2:
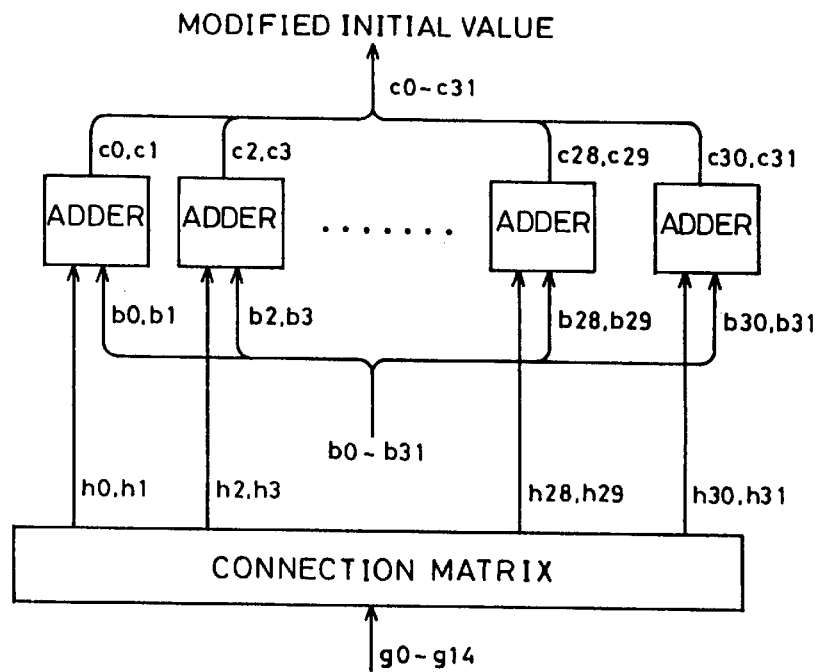
FIG. 2 is a block diagram showing an initial value modification circuit in the PN signal generation circuit.
Figure 3:
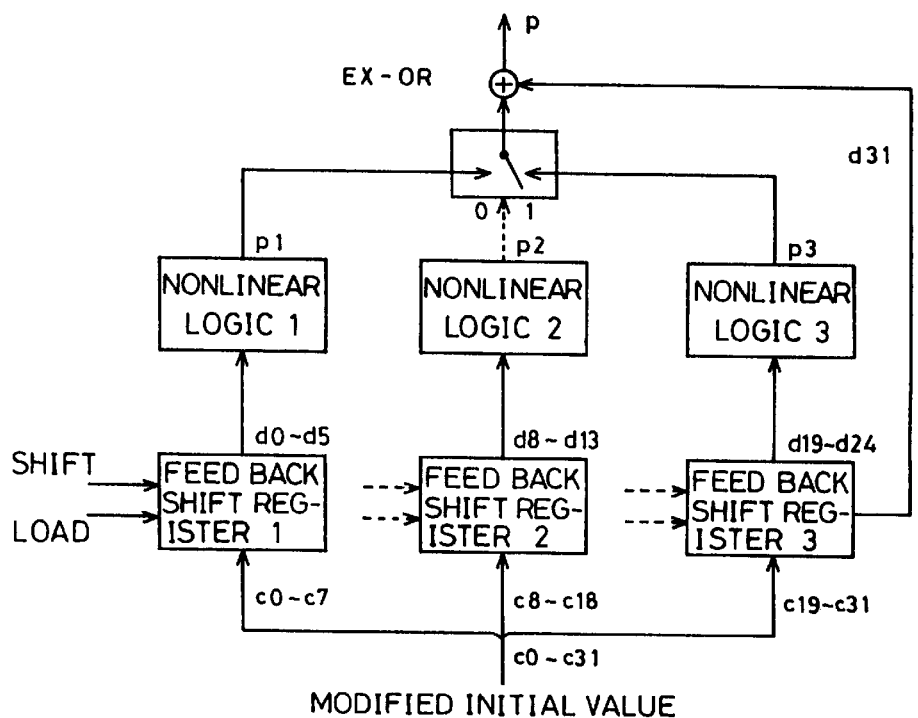
FIG. 3 is a block diagram showing one example of a PRBS generation circuit of the PN signal generation circuit.

The second random number generator 64 includes PN signal generation circuits 66, 68 and 70 of L, M and N (L,M and are integers) stages respectively, and L bits data, M bits data and N bits data of the first random number that is of 32 bits and outputted from the first random number generator 62 are applied to the PN signal generation circuits 66, 68 and 70 as initial values, respectively. More specifically, each of the PN signal generation circuits 66, 68 and 70 includes a feed back register as shown in FIG. 3, and L bits data, the M bits data and the N bits of the first random number are applied to the feed back registers as the initial values, respectively. Then, PN signals from the PN signal generation circuits 66, 68 and 70 are applied to nonlinear logic circuits 72, 74 and 76, respectively.

The nonlinear logic circuit 72 includes AND gates, an exclusive OR circuit and etc. as shown in, for example, FIG. 10, which modifies the PN signal with using, for example, lower 4 bit data of the data packet number (FIG. 5) as modification data. A reason why the lower 4 bit data of the data packet number is utilized as the modification data is that since the lower 4 bit data is changed at every packet, it is difficult for an outsider to descramble the data unfairly or irregularly. In addition, since nonlinear logic circuits 74 and 76 are the same as the nonlinear logic circuit 72, a duplicate description will be omitted here.

The PN signals modified by nonlinear logic circuits 72 and 76 are applied to a switch 78 which is controlled by a modified PN signal by the nonlinear logic circuit 74. Accordingly, either the modified PN signal by the nonlinear logic circuit 72 or the modified PN signal by the nonlinear logic circuit 76 is outputted from the switch 78.

With referring to FIG. 10, one example of the nonlinear logic circuit 72 will be described. The nonlinear logic circuit 72 receives each of bit data from a shift register 80 included in the PN signal generation circuit 66. In this embodiment shown in FIG. 10, the most significant bit data and a third bit data from the most significant bit of the shift register 80 are applied to AND gates 82 and 84, respectively, and an i-th bit data and a k-th bit data are applied to OR gates 86 and 88, respectively. Then, outputs of the AND gates 86 and 88, and predetermined bit data from a j-th bit to an n-th bit except the i-th bit and the k-th bit are applied to an AND gate 90, an output of the AND gate 90 is applied to an adder 92. A second bit data from the most significant bit of the shift register 80 and outputs from the AND 82 and 84 are also applied to the adder 92. Then, the AND gates 82 and 84 and the OR gates 86 and 88 are controlled by respective bit data of the modification (4 bits).

Thus, the modified PN signal is outputted from the second random number generator 64 shown in FIG. 9 to be applied to one input terminal of an AND gate 94. An output of a scramble determination circuit 30 is applied to another input terminal of the AND gate 94. The scramble determination circuit 30 outputs a high level signal indicative of "scrambled" in a case where a service identification code included in the prefix shown in FIG. 5 is either "4", "5", or "6", and an information code shown in the following table 1 is "1". The scramble determination circuit 30 also outputs the high level signal in a case where although the service identification code is either "1", "2" or "3", the information code is "1" and input data is neither the first packet data, the second packet data nor the prefix.

TABLE 1

| b4 | b3 | b2 | b1 | information code | information |
|---|---|---|---|---|---|
| 0 | 0 | 0 | 0 | 0 | no designation |
| 0 | 0 | 0 | 1 | 1 | congestion · period of time |
| 0 | 0 | 1 | 0 | 2 | accident · control |
| 0 | 0 | 1 | 1 | 3 | attention · warning |
| 0 | 1 | 0 | 0 | 4 | parking lot |
| 0 | 1 | 0 | 1 | 5 | } no definition |
| . | . | . | . | . | |
| . | . | . | . | . | |
| . | . | . | . | . | |
| 1 | 1 | 1 | 1 | F | |

If the high level signal is outputted from the scramble determination circuit 30, the random number generation circuit 60 as shown in FIG. 9 is enabled, and the AND gate 94 is turned-on. Accordingly, if the scramble determination circuit 30 determines "scrambled", the modified PN signal outputted from the random number generation circuit 60 is inputted to the exclusive OR circuit 32 through the AND gate 94. Then, the exclusive OR circuit 32 descrambles packets data outputted from the error correction circuit 24 with utilizing the modified PN signal.

In the above described embodiment, a method for descrambling the input (received) data by generating the scramble key data in the FM multiple radio broadcasting receiver 10. However, it is easy to understand that a method for scrambling in an FM multiple radio broadcasting transmitting apparatus is approximately the same as the method for descrambling. In a case of transmitter, it is necessary to process the modified PN signal from the random number generation circuit and transmitting data by the exclusive OR circuit 32, and modulate result data for transmitting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for scrambling FM subcarrier data, comprising steps of:
    (a) generating a first random number on the basis of a data group number and a data packet number included in a prefix of said FM subcarrier data and scramble key data;
    (b) setting said first random number as an initial value;
    (c) generating a second random number on the basis of said initial value; and
    (d) processing said second random number and FM subcarrier data in an exclusive OR manner to output scrambled FM subcarrier data.

2. A method for descrambling FM subcarrier data, comprising steps of:
    (a) generating a first random number on the basis of a data group number and a data packet number included in a prefix of said FM subcarrier data, and scramble key data;
    (b) setting said first random number as an initial value;
    (c) generating a second random number on the basis of said initial value; and
    (d) processing said second random number and FM subcarrier data in an exclusive OR manner to output descrambled FM subcarrier data.

3. A method according to claim 1 or 2, wherein said step (a) includes steps of;
    (a-1) setting a portion of data of said data group number and data of said data packet number into a first M series generation means;
    (a-2) setting said data of said data group number into a second M series generation means;
    (a-3) combining an output of said first M series generation means and an output of said second M series generation means with each other by a combination means;
    (a-4) processing an output of said combination means and said scramble key data in an exclusive OR manner; and
    (a-b 5) regarding data processed by said exclusive OR as said first random number.

4. A method according to claim 1 or 2, wherein said step (c) includes steps of;
    (c-1) generating a PN signal of a plurality of bits on the basis of said initial value by a PN signal generation means;
    (c-2) processing said PN signal in accordance with a nonlinear logic and modification data; and
    (c-3) regarding processed data as said second random number.

5. A method according to claim 4, wherein predetermined data included in said prefix is used as said modification data.

6. A method according to claim 5, wherein a lower bit data of a predetermined number of said data packet number is used as said predetermined data.

7. A method according to claim 4, wherein said PN signal generation means includes a register of a plurality of bits, and said step (c-2) includes steps of;
    (c-4) gating outputs of predetermined bits of said register by gates; and
    (c-5) processing outputs of said gates and said output of said predetermined bits in an exclusive OR manner.

8. A method according to claim 7, wherein said gates are controlled by said modification data.

9. A method according to claim 1 or 2, further comprising a step of (e) generating key data by which FM subcarrier data is scrambled and/or descrambled, said step (e) including (e-1) detecting first key data and second key data both set in a predetermined packet of a data group of said FM subcarrier data, and (e-2) generating scramble key data by processing said first key data and said second key data.

10. A method for generating key data by which FM subcarrier data is scrambled and/or descrambled, comprising:
    (a) detecting first key data and second key data both set in a predetermined packet of a data group of said FM subcarrier data, the number of bits of said first key data being smaller than the number of bits of said second key data;
    (b) expanding said first key data in a manner that the number of bits of said first key data becomes equal to the number of bits of said second key data; and
    (c) generating scramble key data by processing expanded first key data and said second key data, said scramble key data being inputted to a scrambling/descrambling means to scramble/descramble the FM subcarrier data.

11. A method according to claim 10, wherein preliminary key data is used as said first key data, and present key data is used for said second key data.

12. A method according to claim 11, further comprising steps of;
    (c) setting next key data and renewal timing data in a predetermined packet of said FM subcarrier data; and (d) replacing said present key data with said next key data at a renewal timing indicated by said renewal timing data.

13. An apparatus for scrambling FM subcarrier data, comprising:

a first random number generating means which generates a first random number on the basis of a data group number and a data packet number included in a prefix of said FM subcarrier data and scramble key data;

a second random number generating means which receives said first random number as an initial value and generates a second random number on the basis of said initial value; and a first processing means which processes said second random number and FM subcarrier data in an exclusive OR manner to output scrambled FM subcarrier data.

14. An apparatus for descrambling FM subcarrier data, comprising:

a first random number generating means which generates a first random number on the basis of a data group number and a data packet number included in a prefix of said FM subcarrier data and scramble key data;

a second random number generating means which receives said first random number as an initial value and generates a second random number on the basis of said initial value; and a first processing means which processes said second random number and FM subcarrier data in an exclusive OR manner to output scrambled FM subcarrier data.

15. An apparatus according to claim 13 or 14, wherein said first random number generating means includes:

a first M series generation means which is set with a portion of data of said data group number and data of said data packet number;

a second M series generation means which is set with said data of said data group number;

a combination means which combines an output of said first M series generation means and an output of said second M series generation means with each other; and a second processing means which processes an output of said combination means and said scramble key data in an exclusive OR manner, data processed by said exclusive OR being regarded as said first random number.

16. An apparatus according to claim 13 or 14, wherein said second random number generating means includes:

a PN signal generation means which generates a PN signal of a plurality of bits on the basis of said initial value; and a third processing means which processes said PN signal in accordance with a nonlinear logic and modification data, data processed by said third processing means being regarded as said second random number.

17. An apparatus according to claim 16, wherein predetermined data included in said prefix is used as said modification data.

18. An apparatus according to claim 17, wherein a lower bit data of a predetermined number of said data packet number is used as said predetermined data.

19. An apparatus according to claim 16, wherein said PN signal generation means includes a register of a plurality of bits, a gating means which gates outputs of predetermined bits of said register, and a fourth processing means which processes outputs of said gates and said output of said predetermined bits in an exclusive OR manner.

20. An apparatus according to claim 19, wherein said gating means are controlled by said modification data.

21. An apparatus for generating key data by which FM subcarrier data is scrambled and/or descrambled, comprising:

a detecting means which detects first key data and second key data both set in a predetermined packet of a data group of said FM subcarrier data; and a generating means which generates scramble key data by processing said first key data and said second key data, the number of bits of said first key data being smaller than the number of bits of aid second key data, and further comprising an expansion means which expands first key data in a manner that the number of bits of said first key data becomes equal to the number of bits of said second key data prior to said processing.

22. A method according to claim 21, wherein preliminary key data is used as said first key data and present key data is used for said second key data.

23. An apparatus according to claim 22, further comprising a setting means which sets next key data and renewal timing data in a predetermined packet of said FM subcarrier data; and a replacing means which replaces said present key data with said next key data at a renewal timing indicated by said renewal timing data.

24. An apparatus according to claim 13 or 14, further comprising:

a key data generating means which generates key data by which FM subcarrier data is scrambled and/or descrambled, said key data generating means including a detecting means which detects first key data and second key data both set in a predetermined packet of a data group of said FM subcarrier data; and a generating means which generates scramble key data by processing said first key data and said second key data.

* * * * *